United States Patent
Leduc

(10) Patent No.: US 10,138,759 B2
(45) Date of Patent: Nov. 27, 2018

(54) METHOD OF CONTROLLING, AFTER DETECTING A VEHICLE ACCIDENT SITUATION, THROTTLING MEANS FOR AN OPENING PROVIDED ON A CLOSED LOOP PERFORMING A RANKINE CYCLE AND LOOP USING SAME FOR COMMUNICATING AN INSIDE OF THE CLOSED LOOP WITH AMBIENT AIR OUTSIDE THE CLOSED LOOP

(75) Inventor: Pierre Leduc, Beynes (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 267 days.

(21) Appl. No.: 13/594,930

(22) Filed: Aug. 27, 2012

(65) Prior Publication Data

US 2013/0104547 A1 May 2, 2013

(30) Foreign Application Priority Data

Oct. 28, 2011 (FR) ...................................... 11/03306

(51) Int. Cl.
| | | |
|---|---|---|
| *F01K 13/00* | (2006.01) | |
| *F01K 13/02* | (2006.01) | |
| *F01K 23/06* | (2006.01) | |
| *B60R 21/01* | (2006.01) | |
| *B60R 21/013* | (2006.01) | |
| *B60R 21/0132* | (2006.01) | |
| *A45C 9/00* | (2006.01) | |
| *A45C 15/00* | (2006.01) | |
| *F01K 25/10* | (2006.01) | |

(52) U.S. Cl.
CPC .............. *F01K 13/006* (2013.01); *A45C 9/00* (2013.01); *A45C 15/00* (2013.01); *B60R 21/013* (2013.01); *B60R 21/0132* (2013.01); *F01K 23/065* (2013.01); *F01K 25/10* (2013.01)

(58) Field of Classification Search
CPC ...... F01K 13/00–13/006; F01K 23/065; F01K 23/10; F01K 25/10; F01K 15/02; B60K 28/14; B60R 22/32–22/325
USPC ................. 60/645, 646, 657, 658, 660, 667, 60/597–624
See application file for complete search history.

(56) References Cited

U.S. PATENT DOCUMENTS

| | | | | |
|---|---|---|---|---|
| 5,564,280 A | * | 10/1996 | Schilling et al. | ................... 62/84 |
| 7,174,732 B2 | * | 2/2007 | Taniguchi et al. | ............... 62/183 |
| 7,260,934 B1 | * | 8/2007 | Roberts | .......................... 60/651 |

FOREIGN PATENT DOCUMENTS

| | | |
|---|---|---|
| FR | 2 884 555 A1 | 10/2006 |
| KR | 20020047907 A * | 6/2002 |

* cited by examiner

*Primary Examiner* — Laert Dounis
(74) *Attorney, Agent, or Firm* — Fitch, Even, Tabin & Flannery, LLP

(57) ABSTRACT

A closed loop performing a Rankine cycle for a motor vehicle includes a circulation and compression pump for a working fluid, a heat exchanger swept by a hot source for heating said working fluid, expansion means for expanding the hot fluid and a cooling exchanger-swept by a cooling fluid for cooling this working fluid.

A method of controlling the closed loop performing a Rankine cycle for a motor vehicle includes, after detecting a vehicle accident situation, in communicating the inside of the loop with the ambient air.

9 Claims, 1 Drawing Sheet

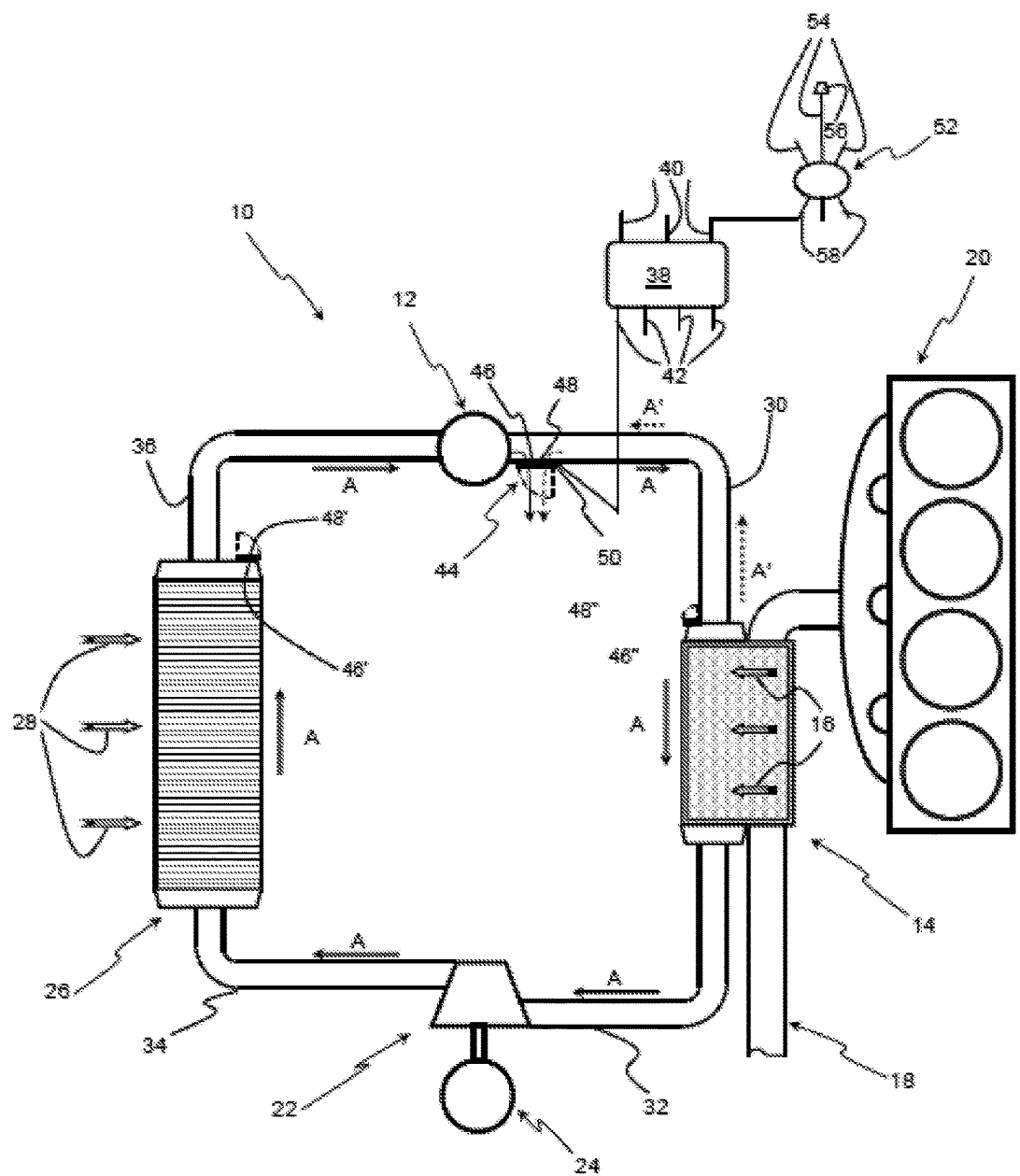

METHOD OF CONTROLLING, AFTER DETECTING A VEHICLE ACCIDENT SITUATION, THROTTLING MEANS FOR AN OPENING PROVIDED ON A CLOSED LOOP PERFORMING A RANKINE CYCLE AND LOOP USING SAME FOR COMMUNICATING AN INSIDE OF THE CLOSED LOOP WITH AMBIENT AIR OUTSIDE THE CLOSED LOOP

FIELD OF THE INVENTION

The present invention relates to a method of controlling a closed loop performing a Rankine cycle and to a loop using same.

As it is well known, a Rankine cycle is a thermodynamic cycle through which heat coming from an external heat source is transmitted to a closed loop that contains a fluid.

BACKGROUND OF THE INVENTION

There are many types of Rankine cycle loops and more particularly those involving a (liquid/vapour) phase change of a working fluid.

This type of cycle generally consists of a stage wherein the working fluid used in liquid form is compressed in an isentropic manner, followed by a stage where this compressed liquid fluid is heated and vaporized on contact with a source of heat.

This vapour is then expanded, in another stage, in an isentropic manner in an expansion machine, then, in a last stage, this expanded vapour is cooled and condensed on contact with a cold source.

To carry out these various stages, the loop comprises a compressor pump for circulating and compressing the fluid in liquid form, an evaporator that is swept by a hot fluid for at least partial vaporization of the compressed fluid, an expansion machine for expanding the vapour, such as a turbine that converts the energy of this vapour to another energy such as a mechanical or electric energy, and a condenser by means of which the heat contained in the vapour is yielded to a cold source, generally outside air that sweeps this condenser so as to convert this vapour to a fluid in liquid form.

In this type of loop, the fluid used is generally water but other types of fluid can also be used, for example organic fluids or organic fluid mixtures.

By way of example, these organic fluids can be butane, ethanol, hydrofluorocarbons, ammonia, carbon dioxide, etc.

It is also well known, notably through document FR-2,884,555, to use the calorific energy conveyed by the exhaust gas of internal-combustion engines, in particular those used for motor vehicles, as the hot source providing heating and vaporization of the fluid flowing through the evaporator.

This allows to improve the energy efficiency of this engine by recovering a large part of the energy lost at the exhaust in order to convert it to an energy that can be used for the motor vehicle through the Rankine cycle loop.

In some instances, the working fluid is caused to circulate at high pressures (up to about 40 bars or even 80 bars) and very high temperatures, close to 400° C. These fluid pressures and temperatures are maintained within the operating range for which the system is dimensioned by means of a control system that acts notably upon the pump, the expansion machine and on the actuators driving the various elements of the loop.

Furthermore, when using certain working fluids, this fluid may also appear to be intrinsically dangerous, notably flammable.

Thus, in case of an abnormal situation of the vehicle, an accident for example, the system controlling the Rankine cycle loop can become inoperative, either as a result of a malfunction of the control system itself or of a malfunction of the sensors or the driving actuators.

Due to the thermal inertia of the hot source or after a vehicle fire that may occur during an accident, the pressure and the temperature of the working fluid can continue to increase. In this case, temperature or pressure levels of this fluid incompatible with the dimensioning of the Rankine system can be reached. These levels can lead to a sudden break in one or more elements of the loop (fluid circulation line, exchanger, etc.), thus causing yet another accident.

The present invention aims to overcome the aforementioned drawbacks by means of a method allowing to take preventive measures so as to limit or even to prevent a closed loop break.

SUMMARY OF THE INVENTION

The present invention therefore relates to a method of controlling a closed loop performing a Rankine cycle for a motor vehicle, said loop comprising a circulation and compression pump for a working fluid, a heat exchanger swept by a hot source for heating said working fluid, expansion means for expanding the hot fluid and a cooling exchanger swept by a cooling fluid for cooling this working fluid, characterized in that it consists, after detecting a vehicle accident situation, in communicating the inside of the loop with the ambient air.

The method can consist in communicating the loop with the ambient air after detecting violent impacts on the vehicle.

The method can consist in communicating the loop with the ambient air after detecting a car fire.

The method can consist in controlling throttling means for an opening provided on the loop for communicating said loop with the ambient air.

The invention also relates to a closed loop performing a Rankine cycle for a motor vehicle comprising a circulation and compression pump for a working fluid, a heat exchanger swept by a hot source for heating said working fluid, expansion means for expanding the hot fluid, a cooling exchanger swept by a cooling fluid for cooling this working fluid and circulation lines for said fluid, characterized in that it comprises a device for communicating the inside of the loop with the ambient air, said device being operative in a vehicle accident situation.

The device can comprise an opening located on at least one element of the loop and throttling means controlling this opening.

The opening can be provided on at least one of the exchangers and/or on at least one of the circulation lines.

The throttling means can comprise a valve switching between an extreme position closing the opening and another extreme position of clearing the opening.

The hot source can come from the exhaust gas of an internal-combustion engine,

BRIEF DESCRIPTION OF THE SOLE FIGURE

Other features and advantages of the invention will be clear from reading the description hereafter, given by way of non limitative example, with reference to the sole FIGURE showing a closed loop performing a Rankine cycle with its control system according to the invention.

DETAILED DESCRIPTION

The present description relates more particularly to a closed loop with a phase change fluid, but any other Rankine cycle loops, such as those referred to as supercritical fluid loops (with $CO_2$ for example), can be used.

In FIG. 1, Rankine cycle closed loop 10 comprises a circulation and compression means 12 for a working fluid, water here, circulating clockwise (arrows A) in this loop. This means, referred to as pump in the rest of the description, allows to compress this water between the pump inlet and its outlet where this water, still in liquid form, is at high pressure.

This pump is advantageously driven in rotation by any known means such as an electric motor (not shown).

This loop also comprises a heat exchanger 14, referred to as evaporator, traversed by the compressed water coming from the pump that flows out of this evaporator in form of hot compressed vapour.

This evaporator is swept by a hot source 16 coming from the exhaust gas circulating in exhaust line 18 of an internal-combustion engine 20.

Preferably, this engine is an internal-combustion engine of a motor vehicle.

This loop also comprises a receiving expansion machine 22 receiving at the intake thereof the high-pressure compressed water vapour, from where the water vapour flows out of this expander in form of low-pressure expanded vapour.

By way of example, this expansion machine is an expansion turbine whose rotor (not shown) is driven in rotation by the water vapour. This rotor is advantageously connected to any known device allowing to use the mechanical energy recovered, for example to a transmission system of a vehicle driving the wheels, or to convert the mechanical energy recovered to another energy, such as an electric generator 24 for example.

The loop also comprises a cooling exchanger 26, referred to as condenser in the rest of the description. This condenser allows to convert the expanded low-pressure vapour coming from the turbine to water in liquid form after passing through this condenser.

By way of example, this condenser consists here of an assembly of cooling tubes and fins swept by a cooling fluid 28 that flows through the condenser between its inlet face and its outlet face while cooling and condensing the expanded vapour.

This cooling fluid is here outside air at ambient temperature, but any other cooling fluid such as water can be used for condensing the vapour.

The various elements of the loop are connected to one another by fluid circulation lines 30, 32, 34, 36 allowing to connect successively the pump to the evaporator (line 30), the evaporator to the turbine (line 32), the turbine to the condenser (line 34) and the condenser to the pump (line 36) so that the working fluid circulates, in liquid or vapour form, in the direction shown by arrows A.

As it is widely known, this loop is connected to a control system 38 allowing management thereof. Notably, this system receives information on the operation of this loop through lines 40. More particularly, some of these lines receive information from various detectors provided in this loop, such as the pressure or the temperature of the water (or of the water vapour). From the information received, system 38 controls elements of the loop through control lines 42 necessary to obtain the desired operating range. These control lines notably allow to act upon pump 12 and turbine 22.

The loop illustrated in the sole FIGURE also comprises a closed loop venting device 44 allowing partial or total preventive discharge of the fluid contained in this loop.

This device comprises an opening 46 provided on one of the circulation lines, here circulation line 30 provided between pump 12 and evaporator 14.

Without departing from the scope of the invention, this opening (see opening 46' or 46") can also be provided on one or more elements of the loop such as the heating and/or cooling exchangers, the pump, and the turbine.

Throttling means are arranged on this opening so as to seal or clear it.

Advantageously, these throttling means include a valve 48, preferably bistable, which tilts around a tilt axis 50. Tilting of this valve is controlled by any known means, by way of example here an electric motor (not shown).

Tilting of this valve is advantageously controlled by control lines 42 of control system 38 acting upon the electric tilt motor.

This control system 38 also receives, through a line 40, information from a vehicle abnormal situation management unit.

By way of example, this unit can be an accident controller 52, commonly referred to as crash line, provided to reduce the consequences in case of a car crash, such as a collision, a fire, a vehicle overturn, etc.

This controller thus allows to carry out many preventive actions intended to reduce the consequences of this accident situation and in particular in case of a violent impact against a stationary or moving obstacle.

More precisely, this controller comprises information lines 54 some of which are connected to detectors 56 such as shock detectors and/or sudden vehicle deceleration detectors.

After receiving the information relative to this car crash situation, the controller transmits, through one or more control lines 58, one or more signals for triggering vehicle safety elements. These elements can be air bags and/or seat belt pre-tensioners.

These signals can also trigger vehicle power cut, hood raising so as to provide a shock-absorbing device, notably in case of a collision with a pedestrian, retraction of the wiper blades so as to prevent a pedestrian from being hurt, etc.

After receiving the signal coming from the controller that has detected an accident situation, control system 38 also controls loop venting.

This system controls, through a line 42, the motor of valve 48 so that it switches from an initial closed position of opening 46, as shown in thick line in the FIGURE, to an open position of this opening 46 (shown in dotted line in the FIGURE).

Thus, the inside of the loop is communicated with the ambient air by venting it.

Opening 46 is thus no longer sealed and the working fluid contained in loop 10 can be discharged, totally or partly, through this opening, either through gravity or under the effect of the pressure prevailing in the loop.

This working fluid can of course be discharged in liquid or gas form in the direction of circulation of arrows A. This fluid can also be discharged in an opposite direction of circulation (arrow A') if the fluid contained in the loop cannot circulate in the conventional direction, for example due to the obstruction of one or more circulation lines.

This preventive discharge can thus prevent a loop break that might occur long after detecting this abnormal vehicle situation, an accident as it happens here.

This helps avoid worsening of the situation, notably during the intervention of a rescue team operating on the car.

Alternatively, valve 48 can also be controlled by one of lines 58 coming directly from accident controller 52.

Of course, this vehicle accident situation can concern any other circumstance such as a fire, in which case communication with the ambient air allows preventive emptying of the loop so as to avoid any sudden loop break.

This fire can be detected by any known means such as fume detectors or temperature detectors connected to accident controller 52.

Without departing from the scope of the invention, the opening (see opening 46' or 46") and the valve (see valve 48' or 48") can also be arranged on other circulation lines and/or on one of the loop elements: exchangers, pump, turbine, etc.

The invention claimed is:

1. A method of controlling a closed loop performing a Rankine cycle for a motor vehicle, said loop comprising a circulation and compression pump for a working fluid, a heat exchanger swept by a hot source for heating said working fluid, expansion means for expanding the hot fluid and a cooling exchanger swept by a cooling fluid for cooling this working fluid connected by fluid circulation lines, the method comprising, detecting a vehicle accident situation and, in response to detecting a vehicle accident situation, controlling throttling means for an opening provided on the closed loop for communicating an inside of the closed loop with ambient air outside the closed loop to totally discharge the working fluid contained in the closed loop.

2. The method as claimed in claim 1, wherein controlling throttling means for the opening provided on the closed loop occurs in response to detecting impacts on the vehicle.

3. The method as claimed in claim 1, wherein detecting a vehicle accident situation comprises detecting shock and/or sudden vehicle deceleration.

4. A closed loop system performing a Rankine cycle for a motor vehicle, comprising:
   a closed loop comprising a circulation and compression pump for a working fluid, a heat exchanger swept by a hot source for heating said working fluid, expansion means for expanding the hot fluid, and a cooling exchanger swept by a cooling fluid for cooling this working fluid connected by fluid circulation lines for said fluid;
   throttling means for an opening provided on the closed loop for communicating an inside of the closed loop with ambient air outside the closed loop; and
   at least one controller configured to detect a vehicle accident situation and to control, in response to detecting a vehicle accident situation, the throttling means for the opening provided on the closed loop for communicating an inside of the closed loop with ambient air outside the closed loop to totally discharge the working fluid contained in the closed loop.

5. The closed loop as claimed in claim 4, wherein the opening provided on the closed loop for communicating an inside of the closed loop with ambient air outside the closed loop is provided on at least one of exchangers.

6. The closed loop as claimed in claim 4, wherein the opening provided on the closed loop for communicating an inside of the closed loop with ambient air outside the closed loop is provided on at least one of the fluid circulation lines.

7. The closed loop as claimed in claim 4, wherein the throttling means comprise a valve switching between a position closing the opening and another position clearing the opening.

8. The closed loop as claimed in claim 4, characterized in that hot source comes from the exhaust gas of an internal-combustion engine.

9. The closed loop as claimed in claim 4, wherein the at least one controller configured to detect a vehicle accident situation comprises information lines connected to a shock detector and/or a sudden vehicle deceleration detector.

* * * * *